US012630214B2

(12) United States Patent
Chae et al.

(10) Patent No.: US 12,630,214 B2
(45) Date of Patent: May 19, 2026

(54) APPARATUS FOR STEERING BY WIRE AND OPERATING METHOD THEREOF

(71) Applicant: HL MANDO CORPORATION, Pyeongtaek (KR)

(72) Inventors: Hansang Chae, Pyeongtaek (KR); Sunggun Lee, Pyeongtaek (KR); Jaewoo Lee, Pyeongtaek (KR)

(73) Assignee: HL MANDO CORPORATION, Pyeongtaek (KR)

( * ) Notice: Subject to any disclaimer, the term of this patent is extended or adjusted under 35 U.S.C. 154(b) by 172 days.

(21) Appl. No.: 18/443,544

(22) Filed: Feb. 16, 2024

(65) Prior Publication Data

US 2025/0229829 A1     Jul. 17, 2025

(30) Foreign Application Priority Data

Jan. 12, 2024     (KR) ........................ 10-2024-0005295

(51) Int. Cl.
B62D 5/04          (2006.01)
(52) U.S. Cl.
CPC .................................. B62D 5/0481 (2013.01)

(58) Field of Classification Search
CPC ..................................................... B62D 5/0481
See application file for complete search history.

(56) References Cited

U.S. PATENT DOCUMENTS

2018/0297630 A1* 10/2018 Kim ........................ B62D 6/002
2022/0153343 A1*  5/2022 Iida ........................ B62D 6/008

FOREIGN PATENT DOCUMENTS

JP          2022-079086 A      5/2022
KR     10-2014-0110424 A      9/2014

OTHER PUBLICATIONS

KR Office Action dated Nov. 21, 2025.

* cited by examiner

*Primary Examiner* — Jacob M Amick
(74) *Attorney, Agent, or Firm* — Harvest IP Law, LLP

(57) ABSTRACT

Disclosed are an apparatus for steering by wire and an operating method thereof, in which by detecting whether a failure occurs in a torsion bar mounted on the apparatus for steering by wire based on sensing information of the apparatus for steering by wire, steering stability can be enhanced, and an accident due to steering instability can be prevented.

13 Claims, 6 Drawing Sheets

APPARATUS FOR STEERING BY WIRE AND OPERATING METHOD THEREOF

CROSS-REFERENCE TO RELATED APPLICATIONS

This application claims benefit and priority to Korean Patent Application No. 10-2024-0005295, filed on Jan. 12, 2024, with the Korean Intellectual Property Office, the disclosure of which is incorporated herein in its entirety by reference.

TECHNICAL FIELD

The present disclosure relates to an apparatus for steering by wire and an operating method thereof.

BACKGROUND

A steer-by-wire scheme steering apparatus that connects a steering wheel and a road wheel with each other through an electrical signal is constituted by a steer wheel feedback actuator (SFA) and a road wheel actuator (RWA) unlike a universal steering apparatus. An SFA system transfers a steering angle of a driver to an RWA system, and transfers feedback torque to the driver based on rack force of the RWA system.

In this case, when a failure occurs in a torsion bar mounted on the steering apparatus, the following problems may occur. First, when torque which deviates from a normal range is detected, it may be regarded that a mechanical error occurs in the torsion bar. There may be no problem in steering within a general range, but there may be a problem in that a set steering sense my not evenly operate within a specific range, and there may be a problem in durability performance of the torsion bar. Second, when there is a difference between torque of a left torsion bar and torque of a right torsion bar compared to an initial state, a left-right difference in the steering sense may occur, and as one side becomes lighter, a behavior of a vehicle may become unstable due to steering of a driver. Further, when an error occurs due to mechanical damage of the torsion bar, there may be a serious problem in that steering becomes impossible.

SUMMARY

According to an exemplary embodiment of the present disclosure, an apparatus for steering by wire and an operating method thereof, which detect whether a failure occurs in a torsion bar mounted on the apparatus for steering by wire based on sensing information of the apparatus for steering by wire.

However, it is to be understood that the object to be achieved by the present disclosure is not limited to the above object and may be variously extended without departing from the spirit and scope of the present disclosure.

An exemplary embodiment of the present disclosure provides an apparatus for steering by wire, which is mounted on a vehicle and having a torsion bar, which includes: a first ECU controlling a steer wheel feedback actuator (SFA), and detecting a failure occurs in the torsion bar based on sensing information of the apparatus for steering by wire; and a second ECU controlling a road wheel actuator (RWA).

Here, the sensing information may include a current torque of the torsion bar, a current torque of a motor of the SFA, a current speed of the motor, and a current angle of a steering wheel.

Here, the first ECU may determine a saturation detection result indicating the torsion bar is saturated based on the current torque of the torsion bar, the current torque of the motor, the current speed of the motor, and the current angle of the steering wheel, and detect the failure occurs in the torsion bar based on the sensing information and the saturation detection result.

Here, the first ECU determines that the saturation of the torsion bar occurs when a difference between torque calculated based on the current torque of the motor and the current torque of the torsion bar is larger than a predetermined saturation reference torque, and determines that the saturation of the torsion bar does not occur when the difference between the torque calculated based on the current torque of the motor and the current torque of the torsion bar is smaller than the saturation reference torque to determine the saturation detection result.

Here, the first ECU may determine that the saturation of the torsion bar occurs when the current torque of the motor is larger than a predetermined motor reference torque, the current speed of the motor is smaller than a predetermined motor reference speed, and the difference between the torque calculated based on the current torque of the motor and the current torque of the torsion bar is larger than the saturation reference torque, and determine that the saturation of the torsion bar does not occur when the current torque of the motor is smaller than the motor reference torque, the current speed of the motor is larger than the motor reference speed, and the difference between the torque calculated based on the current torque of the motor and the current torque of the torsion bar is smaller than the saturation reference torque.

Here, the first ECU may detect the failure occurs in the torsion bar by using a predetermined minimum torque and a predetermined maximum torque based on the current torque of the torsion bar and the saturation detection result.

Here, the first ECU may determine that the failure occurs in the torsion bar when the current torque of the torsion bar is larger than the maximum torque or the current torque of the torsion bar is smaller than the minimum torque, and determine that the failure does not occur in the torsion bar when the current torque of the torsion bar is smaller than the maximum torque or the current torque of the torsion bar is larger than the minimum torque.

Here, the first ECU may determine that the failure occurs in the torsion bar regardless of the saturation detection result when the current torque of the torsion bar is larger than the maximum torque, and determine that the failure occurs in the torsion bar if it is determined that the saturation of the torsion bar occurs according to the saturation detection result when the current torque of the torsion bar is smaller than the minimum torque.

Here, the first ECU may detect the failure occurs in the torsion bar by using a left torque of the torsion bar and right torque of the torsion bar based on the current angle of the steering wheel, the current torque of the torsion bar, and the saturation detection result.

Here, when the first ECU determines that the saturation of the torsion bar occurs according to the saturation detection result, the first ECU may detect the failure occurs in the torsion bar based on the left torque and the right torque.

Here, the first ECU may store stores the current torque of the torsion bar as the left torque when the current angle of the steering wheel is a positive number, store the current torque of the torsion bar as the right torque when the current angle of the steering wheel is a negative number, determine that the failure occurs in the torsion bar when a difference between the left torque and the right torque is larger than a predetermined failure reference torque, and determine that the failure does not occur in the torsion bar when the difference between the left torque and the right torque is smaller than the failure reference torque.

Another exemplary embodiment of the present disclosure provides an operating method of an apparatus for steering by wire, which is mounted on a vehicle and having a torsion bar, including acquiring, by a first ECU controlling a steel wheel feedback actuator (SFA), sensing information of the apparatus for steering by wire; and detecting, by the first ECU, a failure occurs in the torsion bar based on the sensing information.

Here, the sensing information may include a current torque of the torsion bar, a current torque of a motor of the SFA, a current speed of the motor, and a current angle of a steering wheel.

Here, the detecting the failure occurs may be achieved by acquiring a saturation detection result indicating the torsion bar is saturated based on the current torque of the torsion bar, the current torque of the motor, the current speed of the motor, and the current angle of the steering wheel, and detecting the failure occurs in the torsion bar based on the sensing information and the saturation detection result.

Here, the detecting the failure occurs may be achieved by detecting the failure occurs in the torsion bar by using a predetermined minimum torque and a predetermined maximum torque based on the current torque of the torsion bar and the saturation detection result, and detecting the failure occurs in the torsion bar by using a left torque of the torsion bar and right torque of the torsion bar based on the current angle of the steering wheel, the current torque of the torsion bar, and the saturation detection result.

According to an exemplary embodiment of the present disclosure, by detecting whether a failure occurs in a torsion bar mounted on the apparatus for steering by wire based on sensing information of the apparatus for steering by wire, steering stability can be enhanced, and an accident due to steering instability can be prevented.

The effects of various embodiments of the present disclosure are not limited to the described effects, and it is apparent to those skilled in the art that various effects are inherent in the present disclosure.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
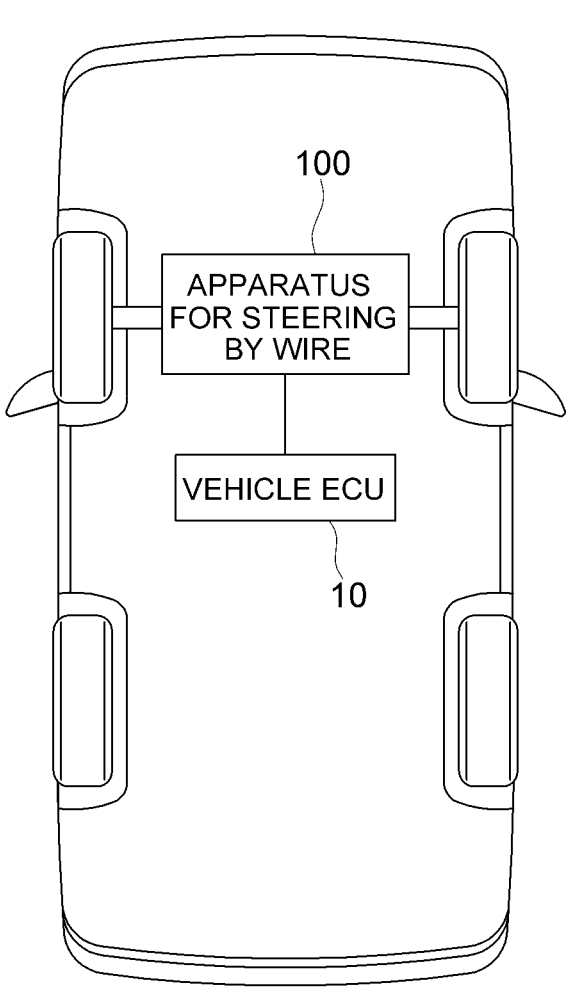
FIG. 1 is a block diagram for describing an apparatus for steering by wire according to an exemplary embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, an exemplary embodiment of the present disclosure will be described in detail with reference to the accompanying drawings. Advantages and features of the present disclosure, and methods for accomplishing the same will be more clearly understood from contents described in detail below with reference to the accompanying drawings. However, the embodiment of the present disclosure not be limited to the exemplary embodiments posted below, but can be implemented in different forms, and the exemplary embodiments of the present disclosure are defined by the category of the claim.

Throughout the whole specification, the same reference numerals denote the same elements. Unless otherwise defined, all terms (including technical and scientific terms) used in this specification may be used as the meaning which may be commonly understood by the person with ordinary skill in the art, to which the present disclosure pertains. Further, terms defined in commonly used dictionaries should not be interpreted in an idealized or excessive sense unless expressly and specifically defined.

In this specification, the terms "first", "second", and the like are used to differentiate a certain component from other components, but the scope should not be construed to be limited by the terms. For example, a first component may be referred to as second component, and similarly, the second component may be referred to as first component.

In this specification, in each step, reference numerals (e.g., a, b, c, etc.) are used for convenience of description, the reference numerals are not used to describe the order of the steps and unless otherwise stated, it may occur differently from the order specified. That is, the respective steps may be performed similarly to the specified order, performed substantially simultaneously, and performed in an opposite order.

In this specification, expressions such as "have", "can have", "include" or "can include", etc. are the presence of the corresponding features (e.g., components such as, numerical value, function, operation, or element), and the presence of an additional feature is not excluded.

Further, the term "unit" disclosed in the specification means software and hardware components such as field programmable gate array (FPGA) or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcodes, circuitry, data structures, and variables. Functions provided in the components and the "units" may be combined into a smaller number of components and "units" or further separated into additional components and "units".

Hereinafter, an apparatus for steering by wire and an operating method thereof according to an exemplary embodiment of the present disclosure will be described in detail with reference to the accompanying drawings.

First, an apparatus for steering by wire according to an exemplary embodiment of the present disclosure will be described with reference to FIG. 1.

FIG. 1 is a block diagram for describing an apparatus for steering by wire according to an exemplary embodiment of the present disclosure.

Referring to FIG. 1, the apparatus 100 for steering by wire according to an exemplary embodiment of the present disclosure may be mounted on a vehicle, and change a progress direction of the vehicle by a steer-by-wire scheme which connects a steering wheel and a road wheel to each other through an electrical signal according to a control command of a vehicle electronic control unit (ECU) 10.

In particular, the apparatus 100 for steering by wire as an apparatus 100 for steering by wire, which includes a torsion bar may detect whether a failure occurs in the torsion bar based on sensing information of the apparatus 100 for steering by wire.

As a result, the apparatus 100 for steering by wire can enhance steering stability, and prevent an accident due to steering instability.

Then, the apparatus for steering by wire according to an exemplary embodiment of the present disclosure will be described in more detail with reference to FIGS. 2 and 3.

Figure 2:
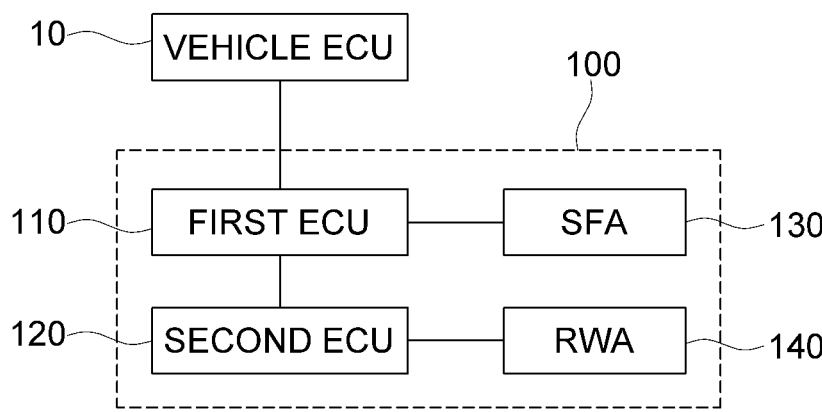
FIG. 2 is a block diagram describing a configuration of the apparatus for steering by wire illustrated in FIG. 1.
Figure 3:
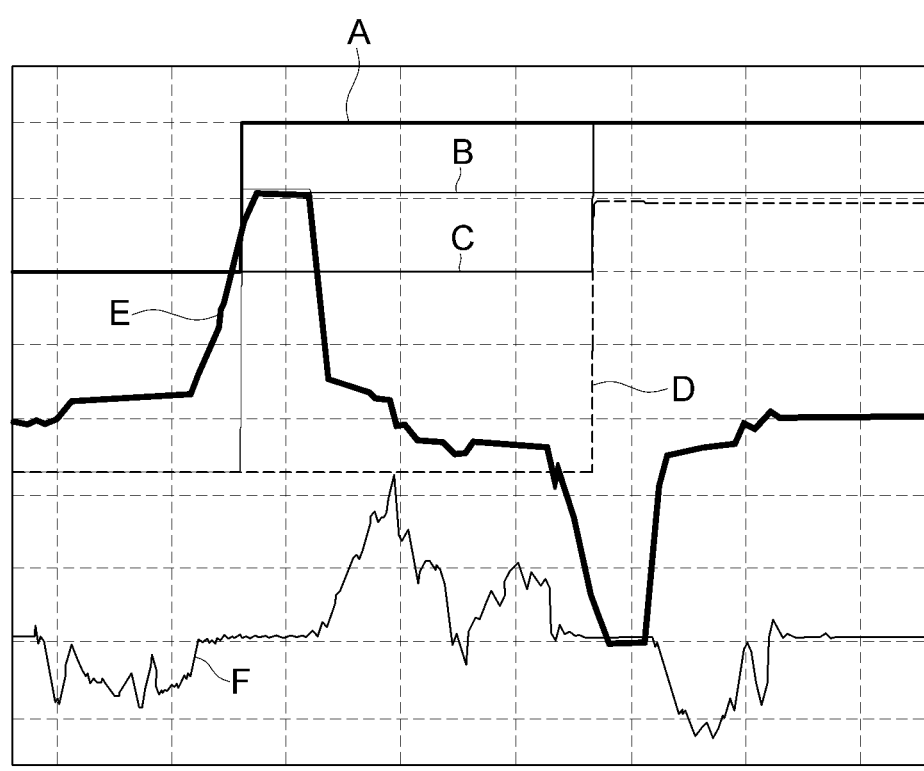
FIG. 3 is a diagram describing an example of an operation of detecting whether a failure occurs in a torsion bar according to an exemplary embodiment of the present disclosure.

FIG. 2 is a block diagram describing a configuration of the apparatus for steering by wire illustrated in FIG. 1 and FIG. 3 is a diagram describing an example of an operation of detecting whether a failure occurs in a torsion bar according to an exemplary embodiment of the present disclosure.

Referring to FIG. 2, the apparatus 100 for steering by wire may include a first ECU 110, a second ECU 120, a steer wheel feedback actuator (SFA) 130, and a road wheel actuator (RWA) 140.

The first ECU 110 may control the SFA 130, and detect whether the failure occurs in the torsion bar based on the sensing information of the apparatus for steering by wire.

Here, the sensing information may include torsion bar torque indicating current torque of the torsion bar, motor torque indicating current torque of a motor (not illustrated) of the SFA 130, a motor speed indicating a current speed of the motor of the SFA 130, and a steering wheel angle indicating a current angle of a steering wheel.

For example, the first ECU 110 may measure the torsion bar torque by multiplying a up and down twisting angle of the torsion bar, which is measured by twisting rigidity based on torsion bar specification information in which a twisting angle of a normal sample is defined. In addition, the first ECU 110 may acquire the current angle of the steering wheel based on a torque value sensed through a torque sensor (not illustrated) of the SFA 130. Moreover, conventionally known technology is used in a process of measuring the torsion bar torque and a process of acquiring the steering wheel angle, so a detailed description is omitted.

That is, the first ECU 110 performs a first torsion bar failure detecting operation of detecting the failure by determining whether the torque of the torsion bar is within a normal range and a second torsion bar failure detecting operation of detecting the failure based on a left and right torque difference of the torsion bar to detect whether the failure occurs in the torsion bar based on the sensing information.

In addition, when the first ECU 110 determines that the failure occurs in the torsion bar for one of a result according to the first torsion bar failure detecting operation and a result according to the second torsion bar failure detecting operation, the first ECU 110 may determine that the failure occurs in the torsion bar.

More specifically, the first ECU 110 may acquire a saturation detection result indicating whether the torsion bar is saturated based on the torsion bar torque, the motor torque, the motor speed, and the steering wheel angle.

That is, the first ECU 110 determines that the saturation of the torsion bar occurs when a difference between torque calculated based on the motor torque and the torsion bar torque is larger than a predetermined saturation reference torque, and determines that the saturation of the torsion bar does not occur when the difference between the torque calculated based on the motor torque and the torsion bar torque is smaller than the saturation reference torque to acquire the saturation detection result. In this case, the first ECU 110 may calculate a torque (i.e., an actual driver torque) by multiplying a deceleration ratio predetermined in the motor torque and predetermined efficiency. For example, the saturation reference torque may be set to "7 Nm".

In this case, when the motor torque is larger than a predetermined motor reference torque, the motor speed is smaller than a predetermined motor reference speed, and the difference between the torque calculated based on the motor torque and the torsion bar torque is larger than the saturation reference torque, the first ECU 110 may determine that the saturation of the torsion bar occurs. For example, the motor reference torque may be set to "2 Nm", and the motor reference speed may be set to "1 rpm". In contrast, when the motor torque is smaller than the motor reference torque, the motor speed is larger than the motor reference speed, and the difference between the torque calculated based on the motor torque and the torsion bar torque is smaller than the saturation reference torque, the first ECU 110 may determine that the saturation of the torsion bar does not occur.

Then, the first ECU 110 may detect whether the failure occurs in the torsion bar based on the sensing information and the saturation detection result.

That is, the first ECU 110 may detect whether the failure occurs in the torsion bar by performing the first torsion bar failure detecting operation by using a predetermined minimum torque and a predetermined maximum torque based on the torsion bar torque and the saturation detection result. For example, the minimum torque may be set to "3 Nm", and the maximum torque may be set to "10 Nm".

In other words, when the torsion bar torque is larger than the maximum torque or the torque bar torque is smaller than the minimum torque, the first ECU 110 may determine that the failure occurs in the torsion bar. In contrast, when the torsion bar torque is smaller than the maximum torque or the torque bar torque is larger than the minimum torque, the first ECU 110 may determine that the failure does not occur in the torsion bar.

In this case, when the torsion bar torque is larger than the maximum torque, the first ECU 110 may determine that the failure occurs in the torsion bar regardless of the saturation detection result. Even though the saturation of the torsion bar does not occur, when the torsion bar torque is equal to or larger than the maximum torque, the failure occurs in the torsion bar, so a saturation detection result is not considered. In contrast, when the torsion bar torque is smaller than the minimum torque, if the first ECU 110 determines that the saturation of the torsion bar occurs according to the saturation detection result, the first ECU 110 may determine that failure occurs in the torsion bar.

Further, the first ECU 110 may detect whether the failure occurs in the torsion bar by performing the second torsion bar failure detecting operation by using a left torque of the torsion bar and right torque of the torsion bar based on the steering wheel angle, the torsion bar torque, and the saturation detection result.

In other words, when the first ECU 110 determines that the saturation of the torsion bar occurs according to the saturation detection result, the first ECU 110 may detect whether the failure occurs in the torsion bar based on the left torque and the right torque.

In this case, the first ECU 110 may store the torsion bar torque as the left torque when the steering wheel angle is a positive number. In addition, the first ECU 110 may store the torsion bar torque as the right torque when the steering wheel angle is a negative number. In addition, when a difference between the stored left torque and the stored right torque is larger than a predetermined failure reference torque, the first ECU 110 may determine that the failure occurs in the torsion bar. In contrast, when the difference between the left torque and the right torque is smaller than the failure reference torque, the first ECU 110 may determine that the failure does not occur in the torsion bar. For example, the failure reference torque may be set to "4 Nm".

In addition, the second ECU 120 may control the RWA 140 based on a driver steering angle provided from the first ECU 110.

For example, it is assumed that the sensing information is acquired as illustrated in FIG. 3. That is, "A" of FIG. 3 represents a left torque storage flag, "B" of FIG. 3 represents the left torque, "C" of FIG. 3 represents a right torque storage flag, "D" of FIG. 3 represents the right torque, "E" of FIG. 3 represents the motor torque, and "F" of FIG. 3 represents the motor speed. That is, the first ECU 110 performs a saturation detecting operation of the torsion bar, the first torsion bar failure detecting operation of detecting the failure by determining whether the torque of the torsion bar is within the normal range, and the second torsion bar failure detecting operation of detecting the failure based on the left and right torque difference of the torsion bar to detect whether the failure occurs in the torsion bar based on the sensing information illustrated in FIG. 3. In addition, when the first ECU 110 determines that the failure occurs in the torsion bar for one of a result according to the first torsion bar failure detecting operation and a result according to the second torsion bar failure detecting operation, the first ECU 110 may determine that the failure occurs in the torsion bar. For example, when the right torque is "4 Nm" and the left torque is "9 Nm", the first ECU 110 may determine that the failure does not occur in the torsion bar according to the first torsion bar failure detecting operation, but determine that the failure occurs in the torsion bar according to the second torsion bar failure detecting operation.

Then, an operating method of the steering apparatus according to an exemplary embodiment of the present disclosure will be described with reference to FIGS. 4 to 6.

Figure 4:
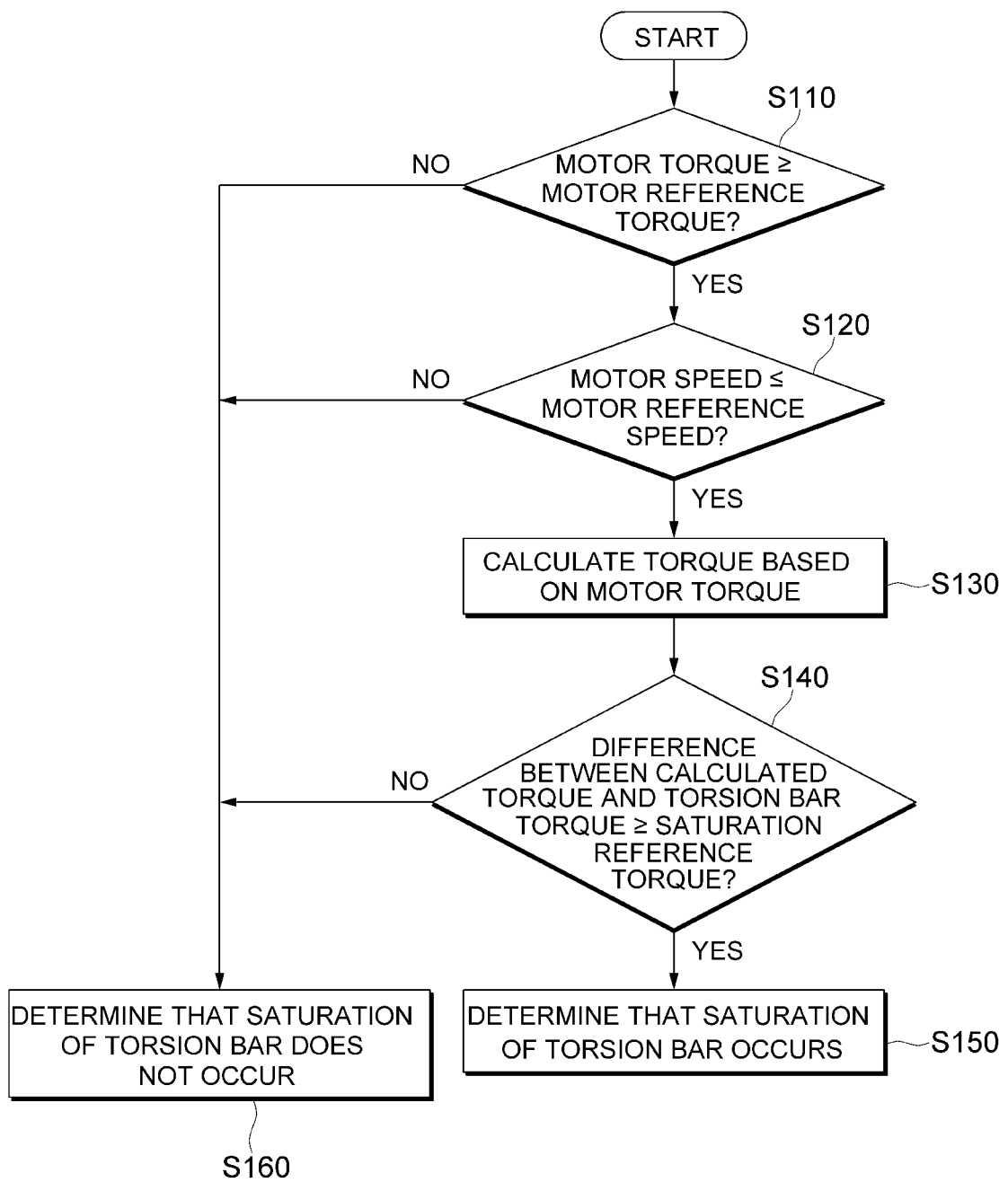
FIG. 4 is a flowchart describing an operation of acquiring a saturation detection result according to an exemplary embodiment of the present disclosure.
Figure 5:
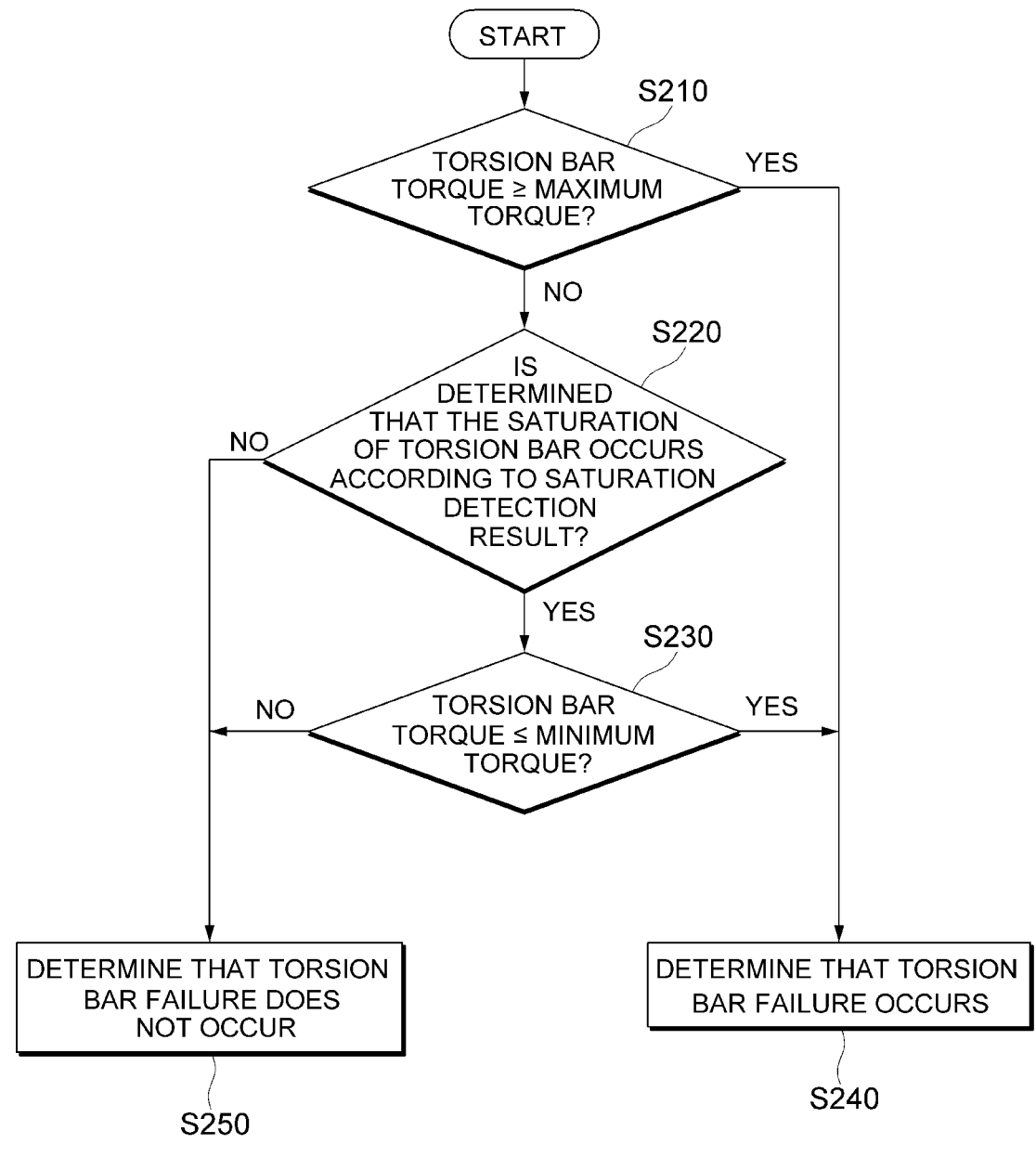
FIG. 5 is a flowchart describing an operation of detecting whether a failure occurs in a first torsion bar according to an exemplary embodiment of the present disclosure.
Figure 6:
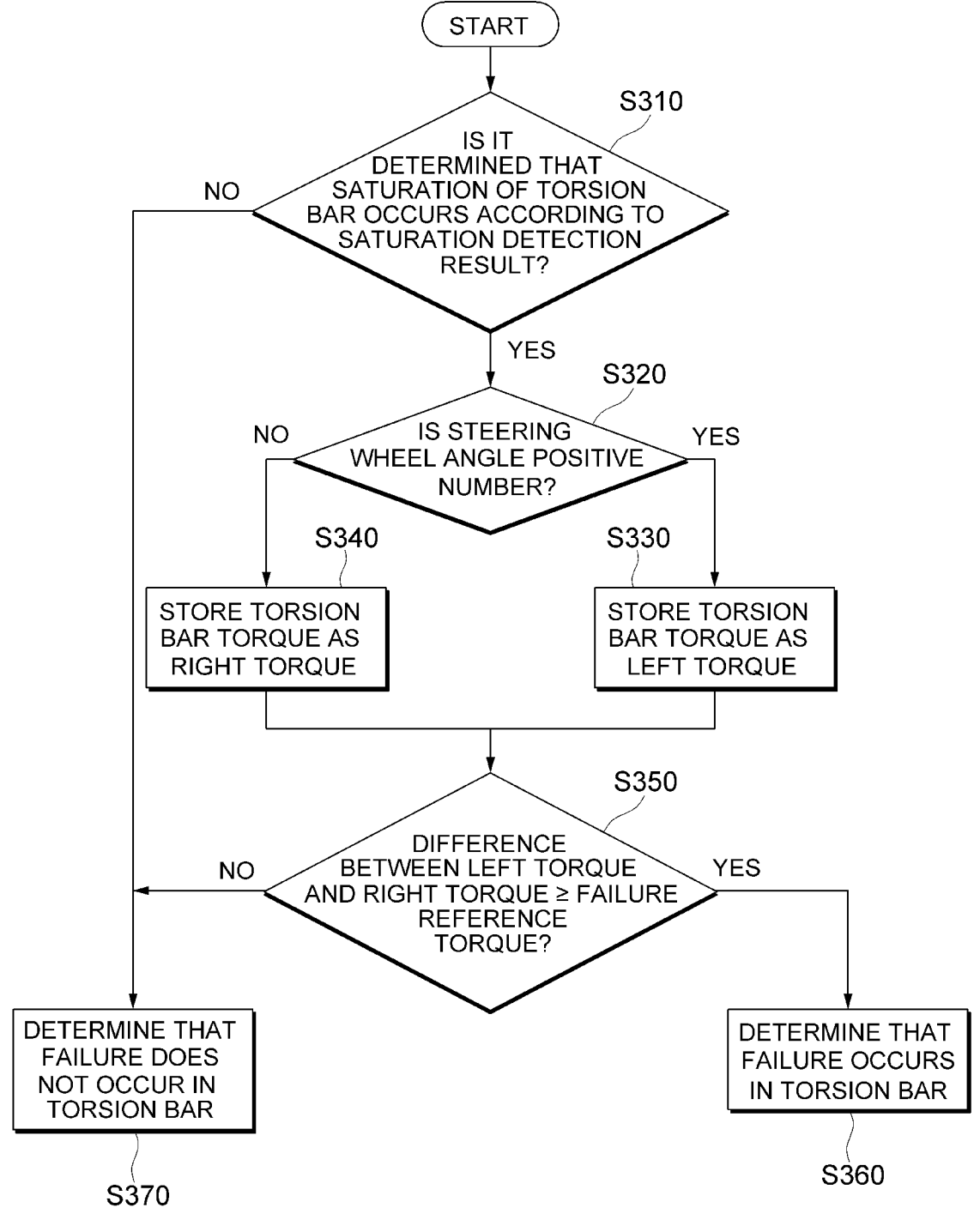
FIG. 6 is a flowchart describing an operation of detecting whether a failure occurs in a second torsion bar according to an exemplary embodiment of the present disclosure.

FIG. 4 is a flowchart describing an operation of acquiring a saturation detection result according to an exemplary embodiment of the present disclosure, FIG. 5 is a flowchart describing an operation of detecting whether a failure occurs in a first torsion bar according to an exemplary embodiment of the present disclosure, and FIG. 6 is a flowchart describing an operation of detecting whether a failure occurs in a second torsion bar according to an exemplary embodiment of the present disclosure.

A first ECU 110 of the apparatus 100 for steering by wire may acquire sensing information of the apparatus 100 for steering by wire.

Here, the sensing information may include torsion bar torque indicating current torque of the torsion bar, motor torque indicating current torque of a motor of the SFA 130, a motor speed indicating a current speed of the motor of the SFA 130, and a steering wheel angle indicating a current angle of a steering wheel.

Then, the first ECU 110 performs a first torsion bar failure detecting operation of detecting the failure by determining whether the torque of the torsion bar is within a normal range and a second torsion bar failure detecting operation of detecting the failure based on a left and right torque difference of the torsion bar to detect whether the failure occurs in the torsion bar based on THE sensing information.

In addition, when the first ECU 110 determines that the failure occurs in the torsion bar for one of a result according to the first torsion bar failure detecting operation and a result according to the second torsion bar failure detecting operation, the first ECU 110 may determine that the failure occurs in the torsion bar.

More specifically, the first ECU 110 may acquire a saturation detection result indicating whether the torsion bar is saturated based on the torsion bar torque, the motor torque, the motor speed, and the steering wheel angle. Referring to FIG. 4, when the motor torque is larger than the motor reference torque (S110-Y), the motor speed may be smaller than the motor reference speed (S120-Y), and the first ECU 110 may calculate the torque based on the motor torque (S130). Then, when the difference between the torque calculated based on the motor torque and the torsion bar torque is larger than the saturation reference torque (S140-Y), the first ECU 110 may determine that the saturation of the torsion bar occurs (S150). In contrast, when the motor torque is smaller than the motor reference torque (S110-N), the motor speed is larger than the motor reference speed (S120-N), and the difference between the torque calculated based on the motor torque and the torsion bar torque is smaller than the saturation reference torque (S140-N), the first ECU 110 may determine that the saturation of the torsion bar does not occur (S160).

In addition, the first ECU 110 may detect whether the failure occurs in the torsion bar by performing the first torsion bar failure detecting operation by using the minimum torque and the maximum torque based on the torsion bar torque and the saturation detection result. Referring to FIG. 5, when the torsion bar torque is larger than the maximum torque (S210-Y), the first ECU 110 may determine that the failure occurs in the torsion bar regardless of the saturation detection result (S240). In contrast, when the torsion bar torque is smaller than the maximum torque (S210-N), the first ECU 110 may determine that the saturation of the torsion bar occurs according to the saturation detection result (S220-Y), and when the torsion bar torque is smaller than the minimum torque (S230-Y), the first ECU 110 may determine that failure occurs in the torsion bar (S240). In contrast, when it is determined that the saturation of the torsion bar does not occur according to the saturation detection result (S220-N), or when the torsion bar torque is larger than the minimum torque (S230-N), the first ECU 110 may determine that the failure does not occur in the torsion bar (S250).

Further, the first ECU 110 may detect whether the failure occurs in the torsion bar by performing the second torsion bar failure detecting operation by using a left torque of the torsion bar and right torque of the torsion bar based on the steering wheel angle, the torsion bar torque, and the saturation detection result. Referring to FIG. 6, when determining that the saturation of the torsion bar occurs according to the saturation detection result (S310-Y), the first ECU 110 may store the torsion bar torque as the left torque or the right torque based on the steering wheel angle. That is, when the steering wheel angle is a positive number (S320-Y) the first ECU 110 may store the torsion bar torque as the left torque (S330). In contrast, when the steering wheel angle is a negative number (S320-N), the first ECU 110 may store the torsion bar torque as the right torque (S340). Then, when a difference between the stored left torque and the stored right torque is larger than a predetermined failure reference torque (S350-Y), the first ECU 110 may determine that the failure occurs in the torsion bar (S360). In contrast, when it is determined that the saturation of the torsion bar does not occur according to the saturation detection result (S310-N), or when the difference between the left torque and the right torque is smaller than the failure reference torque (S350-N), the first ECU 110 may determine that the failure does not occur in the torsion bar (S370).

The operations according to the exemplary embodiments of the present disclosure described above are implemented in a form of a program command which may be performed through various computer means and may be recorded in the computer-readable storage medium. The computer-readable storage medium represents any medium that participates in providing instructions to a processor for execution. The computer-readable storage medium may include a program command, a data file, or a data structure or a combination thereof. For example, the computer-readable storage medium may include a magnetic medium, an optical recording medium, a memory, and the like. A computer program may be distributed on a networked computer system so that a computer readable code may be stored and executed in a distributed manner. Functional programs, codes, and code segments for implementing the exemplary embodiments of the present disclosure may be easily inferred by programmers in the art to which the exemplary embodiments of the present disclosure belong.

The exemplary embodiments of the present disclosure are for describing the technical spirit of the exemplary embodiments, and the scope of the technical spirit of the embodiment is not limited by the exemplary embodiment of the present disclosure. The protection scope of the exemplary embodiments of the present disclosure should be interpreted by the appended claims and all technical spirit in the equivalent range thereto should be interpreted to be embraced by the claims of the exemplary embodiment of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An apparatus for steering by wire, which is mounted on a vehicle and having a torsion bar, the apparatus comprising:
   a first ECU controlling a steer wheel feedback actuator (SFA), and detecting that a failure occurs in the torsion bar based on sensing information of the apparatus for steering by wire; and
   a second ECU controlling a road wheel actuator (RWA), wherein the sensing information includes a current torque of the torsion bar a current torque of a motor of the SFA, a current speed of the motor and a current angle of a steering wheel.

2. The apparatus of claim 1, wherein the first ECU determines a saturation detection result indicating the torsion bar is saturated based on the current torque of the torsion bar, the current torque of the motor, the current speed of the motor, and the current angle of the steering wheel, and detects the failure occurs in the torsion bar based on the sensing information and the saturation detection result.

3. The apparatus of claim 2, wherein the first ECU determines that the saturation of the torsion bar occurs when a difference between torque calculated based on the current torque of the motor and the current torque of the torsion bar is larger than a predetermined saturation reference torque, and determines that the saturation of the torsion bar does not occur when the difference between the torque calculated based on the current torque of the motor and the current torque of the torsion bar is smaller than the saturation reference torque to determine the saturation detection result.

4. The apparatus of claim 3, wherein the first ECU determines that the saturation of the torsion bar occurs when the current torque of the motor is larger than a predetermined motor reference torque, the current speed of the motor is smaller than a predetermined motor reference speed, and the difference between the torque calculated based on the current torque of the motor and the current torque of the torsion bar is larger than the saturation reference torque, and
   determines that the saturation of the torsion bar does not occur when the current torque of the motor is smaller than the motor reference torque, the current speed of the motor is larger than the motor reference speed, and the difference between the torque calculated based on the current torque of the motor and the current torque of the torsion bar is smaller than the saturation reference torque.

5. The apparatus of claim 3, wherein the first ECU detects the failure occurs in the torsion bar by using a predetermined minimum torque and a predetermined maximum torque based on the current torque of the torsion bar and the saturation detection result.

6. The apparatus of claim 5, wherein the first ECU determines that the failure occurs in the torsion bar when the current torque of the torsion bar is larger than the maximum torque or the current torque of the torsion bar is smaller than the minimum torque, and
   determines that the failure does not occur in the torsion bar when the current torque of the torsion bar is smaller than the maximum torque or the current torque of the torsion bar is larger than the minimum torque.

7. The apparatus of claim 6, wherein the first ECU determines that the failure occurs in the torsion bar regardless of the saturation detection result when the current torque of the torsion bar is larger than the maximum torque, and
   determines that the failure occurs in the torsion bar if it is determined that the saturation of the torsion bar occurs according to the saturation detection result when the current torque of the torsion bar is smaller than the minimum torque.

8. The apparatus of claim 5, wherein the first ECU detects the failure occurs in the torsion bar by using a left torque of the torsion bar and right torque of the torsion bar based on the current angle of the steering wheel, the current torque of the torsion bar, and the saturation detection result.

9. The apparatus of claim 8, wherein when the first ECU determines that the saturation of the torsion bar occurs according to the saturation detection result, the first ECU detects the failure occurs in the torsion bar based on the left torque and the right torque.

10. The apparatus of claim 9, wherein the first ECU stores the current torque of the torsion bar as the left torque when the current angle of the steering wheel is a positive number, stores the current torque of the torsion bar as the right torque when the current angle of the steering wheel is a negative number, determines that the failure occurs in the torsion bar when a difference between the left torque and the right torque is larger than a predetermined failure reference torque, and determines that the failure does not occur in the torsion bar when the difference between the left torque and the right torque is smaller than the failure reference torque.

11. An operating method of an apparatus for steering by wire, which is mounted on a vehicle and having a torsion bar, the method comprising:

acquiring, by a first ECU controlling a steel steer wheel feedback actuator (SFA), sensing information of the apparatus for steering by wire; and detecting, by the first ECU, that a failure occurs in the torsion bar based on the sensing information;

wherein the sensing information includes a current torque of the torsion bar, a current torque of a motor of the SEA, a current speed of the motor, and a current angle of a steering wheel.

12. The operating method of claim 11, wherein the detecting the failure occurs is achieved by acquiring a saturation detection result indicating the torsion bar is saturated based on the current torque of the torsion bar, the current torque of the motor, the current speed of the motor, and the current angle of the steering wheel, and detecting the failure occurs in the torsion bar based on the sensing information and the saturation detection result.

13. The operating method of claim 12, wherein the detecting the failure occurs is achieved by detecting the failure occurs in the torsion bar by using a predetermined minimum torque and a predetermined maximum torque based on the current torque of the torsion bar and the saturation detection result, and detecting the failure occurs in the torsion bar by using a left torque of the torsion bar and right torque of the torsion bar based on the current angle of the steering wheel, the current torque of the torsion bar, and the saturation detection result.

* * * * *